United States Patent
Warth et al.

(10) Patent No.: US 9,810,300 B2
(45) Date of Patent: Nov. 7, 2017

(54) POWER-SPLIT CONTINUOUSLY VARIABLE TRANSMISSION APPARATUS HAVING A SUMMING PLANETARY TRANSMISSION

(71) Applicant: ZF Friedrichshafen AG, Friedrichshafen (DE)

(72) Inventors: Viktor Warth, Friedrichshafen (DE); Matthias Reisch, Ravensburg (DE); Bernhard Sich, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/035,394

(22) PCT Filed: Oct. 14, 2014

(86) PCT No.: PCT/EP2014/071937
§ 371 (c)(1),
(2) Date: May 9, 2016

(87) PCT Pub. No.: WO2015/071038
PCT Pub. Date: May 21, 2015

(65) Prior Publication Data
US 2016/0290459 A1    Oct. 6, 2016

(30) Foreign Application Priority Data
Nov. 14, 2013 (DE) .................. 10 2013 223 243

(51) Int. Cl.
*F16H 37/08* (2006.01)
*F16H 15/52* (2006.01)

(52) U.S. Cl.
CPC ......... *F16H 37/0853* (2013.01); *F16H 15/52* (2013.01); *F16H 2037/0886* (2013.01); *F16H 2037/0893* (2013.01)

(58) Field of Classification Search
None
See application file for complete search history.

(56) References Cited

U.S. PATENT DOCUMENTS

| 1,585,140 A | 5/1926 | Erban |
| 2,209,497 A | 7/1940 | Winger et al. |
| (Continued) | | |

FOREIGN PATENT DOCUMENTS

| CZ | 20032009 A3 | 8/2005 |
| DE | 2409936 A1 | 11/1975 |
| (Continued) | | |

OTHER PUBLICATIONS

International Search Report (English Translation) PCT/EP2014/071937, dated Feb. 12, 2015, (2 pages).
(Continued)

*Primary Examiner* — Justin Holmes
(74) *Attorney, Agent, or Firm* — Dority & Manning, P.A.

(57) ABSTRACT

A power-split, continuously variable transmission includes a summing planetary transmission, at least one additional planetary gear set and a variator, which are in operative connection with each other a plurality of shafts, the shafts of the plurality of shafts are couplable to each other with a plurality of shift elements in order to provide at least three transmission ratio ranges. The variator is a mechanical friction wheel variator with at least three shafts. The summing planetary transmission, the at least one additional planetary gear and the variator are arranged coaxial to one another. In one of the transmission ratio ranges of the at least three transmission ratio ranges, a total power is guidable between a transmission input shaft and a transmission output shaft by the variator. A friction wheel of the variator is approximately cone-shaped, at least in sections.

17 Claims, 7 Drawing Sheets

(56) References Cited

U.S. PATENT DOCUMENTS

| | | | |
|---|---|---|---|
| 5,401,221 A * | 3/1995 | Fellows | F16H 37/086 475/214 |
| 5,984,820 A | 11/1999 | Wedeniwski | |
| 6,726,590 B2 | 4/2004 | Henzler et al. | |
| 6,949,045 B2 | 9/2005 | Wafzig et al. | |
| 7,396,309 B2 | 7/2008 | Heitz et al. | |
| 2008/0242468 A1 | 10/2008 | Wafzig | |

FOREIGN PATENT DOCUMENTS

| | | |
|---|---|---|
| DE | 19644133 A1 | 4/1997 |
| DE | 10121042 C1 | 5/2003 |
| DE | 10154928 A1 | 5/2003 |
| DE | 10249484 A1 | 5/2004 |
| DE | 10260180 A1 | 7/2004 |
| DE | 102004004139 A1 | 8/2005 |
| DE | 102005024738 A1 | 12/2006 |
| EP | 0916873 A2 | 5/1999 |

OTHER PUBLICATIONS

German Search Report DE102013223243.8, dated Nov. 13, 2015. (8 pages).

* cited by examiner

POWER-SPLIT CONTINUOUSLY VARIABLE TRANSMISSION APPARATUS HAVING A SUMMING PLANETARY TRANSMISSION

FIELD OF THE INVENTION

The present invention relates generally to a power-split, continuously variable transmission device with a summing planetary transmission.

BACKGROUND

A change-speed transmission assembly having a continuously toroidal variable transmission and a planetary gears summing transmission is known from DE 101 21 042 C1 this is designed with an input shaft and an output shaft coaxial to it. In the change-speed transmission assembly, a lower driving range for low speeds and an upper driving range with higher driving speeds can be presented, within which a transmission ratio of the change-speed transmission assembly can be changed with continuous variability by the toroidal transmission. In addition, the input shaft can be brought into drive connection with the output shaft under the bypassing of the toroidal transmission by activating a shift element in the form of a shifting clutch at a constant overall transmission ratio relationship, whereas a so-called "direct gear" is then engaged.

It is disadvantageous that, in this operating state of the change-speed transmission assembly, its transmission ratio is not continuously variable to the desired extent.

Furthermore, a change-speed transmission assembly having a toroidal transmission and a planetary transmission is known from DE 101 54 928 A1; in this, a transmission ratio range for forward travel independent of the planetary transmission can be presented. The toroidal transmission is formed in accordance with a so-called "two-chamber principle," and features both a central intermediate shaft connected to central gears of the toroidal transmission on the drive side and to an input shaft and a concentric intermediate shaft connected in a torque-proof manner to the central gears of the toroidal transmission on the output side.

Since, in each case, an axial offset drive is provided as the drive connection between the lay shaft and the concentric intermediate shaft and between the lay shaft and an output shaft, the change-speed transmission assembly has a need for installation space that is undesirably high.

A continuously variable planetary transmission with fixed function components is known from CZ 2003-2009 A3, the planetary gears of which are designed as double truncated cones. The planetary gears are mounted on the housing side in such a manner that they can change their distance to a main axis of the planetary transmission depending on the operating state. At the planetary gears designed as double cones, pressing forces from the outside of a pair of flat rings and pressing forces taking effect from the inside of a pair of rollers have effects on the planetary gears. Both the flat rings and the rollers are adjustable in an axial direction in a mirroring manner, whereas the rollers approach each other when the flat rings move away from one another, and vice versa.

However, it is problematic here that, with the continuously variable planetary transmission, only a limited spread is available, with which a desired operating range of a vehicle cannot be presented.

SUMMARY OF THE INVENTION

Therefore, the present invention is subject to the task of providing a power-split, continuously variable transmission device that is favorable for installation space, by which an operating range of a vehicle can be presented to the desired extent.

The power-split, continuously variable transmission device in accordance with exemplary aspects of the invention is formed with one summing planetary transmission, with at least one additional planetary gear set and with one variator, which are in operative connection with each other in the area of shafts and can be coupled to each other by shift elements for the presentation of at least three transmission ratio ranges in the area of additional shafts. A transmission ratio of the transmission device is continuously variable within the transmission ratio ranges by the variator. The variator is formed as a mechanical friction wheel variator with at least three shafts. In addition, the summing planetary transmission, the at least one additional planetary gear set and the variator are arranged in a manner coaxial to each other in a manner that is favorable for installation space.

In accordance with exemplary aspects of the invention, in one of the transmission ratio ranges, the total power can be guided between a transmission input shaft and a transmission output shaft by the variator, and the transmission ratio of the transmission device is continuously variable without a power splitting and with low power losses, whereas the spread of the transmission ratio range then preferably corresponds to the spread of the variator. In addition, a friction wheel of the variator is designed to be at least approximately cone-shaped, at least in sections, by which an applied torque can be transferred and converted to the desired extent with a need for installation space that is as low as possible in the area of the variator.

Thereby, the option exists to design the friction wheel, at least in sections, with a straight, convex and/or a concave exterior cover of a straight circular cone, an elliptic paraboloid and/or a single-sided or two-sided hyperboloid.

The power-split, continuously variable transmission device in accordance with exemplary aspects of the invention constitutes a power-split multi-range transmission in an input-coupled assembly with a summing planetary transmission and a coaxial mechanical friction wheel variator in a conical structure. Through the transmission device, in a simple manner, the option exists of, with a suitable selection of a constant transmission ratio and a circulation transmission ratio between the transmission output shaft and a first power branch featuring the variator, through the adjustment of the variator into a transmission ratio range or into a driving range, as the case may be, guiding the rotational speed of the transmission output shaft essentially to zero and presenting a stationary output, while the rotational speed of the transmission input shaft is greater than zero, which corresponds to a rotating drive.

From this so-called "geared neutral operating state," through a corresponding adjustment of the variator in both a forward direction and a reverse direction from the vehicle standstill, without an additional start-up element (such as a frictional-locking start-up clutch, a hydrodynamic torque converter or the like), the vehicle drive train designed with the transmission device in accordance with exemplary aspects of the invention can be started up with power splitting. Thus, a vehicle drive train designed with the transmission device in accordance with exemplary aspects of the invention can be designed with a low need for installation space and is characterized by a low overall weight and can be manufactured with low costs.

In addition, by the transmission device, the strategic capacity during a start-up process of a vehicle designed with it can be presented with a low degree of effort. Furthermore, additional functions, such as a hill-holder, can be realized in a simple manner through a corresponding adjustment of the variator.

If, in addition to the start-up transmission ratio range, the transmission device in accordance with exemplary aspects of the invention is operated in a power-split manner in a so-called "overdrive transmission ratio range" or an "overdrive driving range," in its operation, the transmission device features a good transmission efficiency, by which the fuel consumption of a drive motor allocated to the transmission device can be reduced.

With a structurally simple exemplary embodiment of the power-split, continuously variable transmission device, at least one shaft of the variator is in connection with the transmission input shaft, an additional shaft of the variator is operatively connected to the transmission output shaft and an additional shaft of the variator is designed in a torque-proof manner.

An additional form of the power-split, continuously variable transmission device in accordance with exemplary aspects of the invention that is easy to operate and designed with a low degree of structural effort is characterized by the fact that, during the presentation of a transmission ratio range in which the overall power flow between the transmission input shaft and the transmission output shaft can be guided by a variator, the summing planetary transmission is blocked by one of the shift elements.

In order to be able to present the change between the transmission ratio ranges as comfortably as possible, with an additional advantageous exemplary embodiment of the power-split, continuously variable transmission device, the variator, the summing planetary transmission and the at least one planetary gear set are matched with each other such that the change between the transmission ratio ranges can be carried out synchronously. Thereby, a range switching that is at least approximately synchronous offers the option of designing the shift elements as shift elements with low drag torque, such as claw shift elements.

If a negative transmission ratio range is adjustable in the area of the variator, with an additional embodiment of the transmission device in accordance with exemplary aspects of the invention, for adjusting the variable transmission ratio range, an upstream or downstream additional planetary gear set for reversing the rotational speed is allocated to the variator, whereas one shaft of the additional planetary gear set is coupled with the torque-proof shaft of the variator and at least one additional shaft of the additional planetary gear set is coupled with the shaft of the variator, or is connectable with this shaft of the variator by one of the shift elements that is in operative connection with the transmission input shaft.

If one shaft of the at least one additional planetary gear set or of the additional planetary gear set can be coupled with the transmission input shaft by one of the shift elements, the spread that can be presented by the variator or the transmission ratio of the transmission device that can be presented by the variator can be adjusted to the desired extent for the particular application with little effort.

If the at least three transmission ratio ranges can be presented by exactly three shift elements, whereas, for the presentation of the transmission ratio ranges, each of the shift elements is closed and the other shift elements are open and, for a change of the transmission ratio range, each closed shift element is to be opened and each open shift element is to be closed, the transmission device in accordance with exemplary aspects of the invention is designed, in a manner that is favorable for installation space and costs, with a shift element degree equal to 1, which also enables an operation of the transmission device with low control and adjustment effort.

If the variator in accordance with a planetary gear set is designed with a ring gear featuring friction surfaces, the friction wheel formed as a planetary gear and a sun gear likewise featuring friction surfaces, whereas the planetary gear designed at least in sections with a cone shape, with its cone-shaped areas, is in operative connection in a frictional-locking manner with the friction surfaces, designed in a cone-shape, of the sun gear and the ring gear, the power-split, continuously variable transmission device can be manufactured cost-effectively, in a simple manner and with a compact construction, with which a vehicle can be operated in a fuel-efficient manner.

If the planetary gear is formed as a double truncated cone, whereas, in each case, a radius of the truncated cone areas of the planetary gear steadily increases or steadily decreases from the areas of the truncated cone areas turned towards each other in the direction of the areas of the truncated cone areas turned towards each other, and the ring gear and the sun gear are formed to be split, and whereas, in each case, a first part of the ring gear and of the sun gear, with their conical friction surfaces, makes contact with the first truncated cone area of the planetary gear, while a second part of the ring gear and of the sun gear, with their conical friction surfaces, makes contact with the second truncated cone area of the planetary gear, the transmission ratio in the area of the variator is advantageously variable through the spread of the parts of the ring gear or of the sun gear, with simultaneously low bending torque loads in the area of the planetary gear.

For this purpose, with an additional advantageous embodiment of the power-split, continuously variable transmission device in accordance with exemplary aspects of the invention, for varying the transmission ratio of the variator in an axial extension of the planetary gear, the parts of the ring gear and the sun gear are formed in the manner that they are able to be moved to and from each other, whereas the planetary gear is adjustable in relation to the ring gear and the sun gear in a radial direction and with respect to a planetary carrier, in which the planetary gear is rotatably mounted.

In order to be able to adjust the spread of the variator to the desired extent for the particular application with little effort, with an additional advantageous exemplary embodiment of the power-split, continuously variable transmission device, the shaft of the variator is in operative connection through the additional planetary gear set to the transmission input shaft.

With a design of the transmission device that is particularly favorable for installation space and costs, the shaft of the variator in operative connection with the transmission input shaft is connectable by one of the shift elements to a shaft of the at least one additional planetary gear set designed as a sun gear, and by an additional shift element to a shaft of the at least one additional planetary gear set designed as a bar.

With an additional exemplary version of the transmission device that is likewise favorable for installation space and costs, the shaft of the variator in operative connection with the transmission output shaft is coupled by a shaft designed as a sun gear and a shaft of the summing planetary transmission formed as a ring gear with the transmission output shaft.

If the at least one additional planetary gear set in the area of the carrier is connected to a shaft of the summing planetary transmission designed as a carrier, the transmission device in accordance with the invention is characterized by a low need for installation space.

With an additional embodiment of the transmission device in accordance with exemplary aspects of the invention that is preferred and requires only little installation space, the summing planetary transmission in the area of a shaft designed as a ring gear is in operative connection with the transmission output shaft.

Both the characteristics specified in the claims and the characteristics specified in the subsequent embodiments of the transmission device in accordance with the invention are, by themselves alone or in any combination with one another, suitable for providing additional forms for the object in accordance with the invention. In terms of the additional forms of the object under the invention, the particular combinations of characteristics do not represent a limitation; rather, they are essentially solely of an exemplary nature.

Additional advantages and advantageous embodiments of the transmission device in accordance with the invention arise from the claims and the embodiments described below, with reference to the drawing in terms of principle, whereas, in the description of the various embodiments, for the benefit of clarity, the same reference signs are used for structurally and functionally identical components.

BRIEF DESCRIPTION OF THE DRAWINGS

The following is shown.

DETAILED DESCRIPTION

Figure 1:
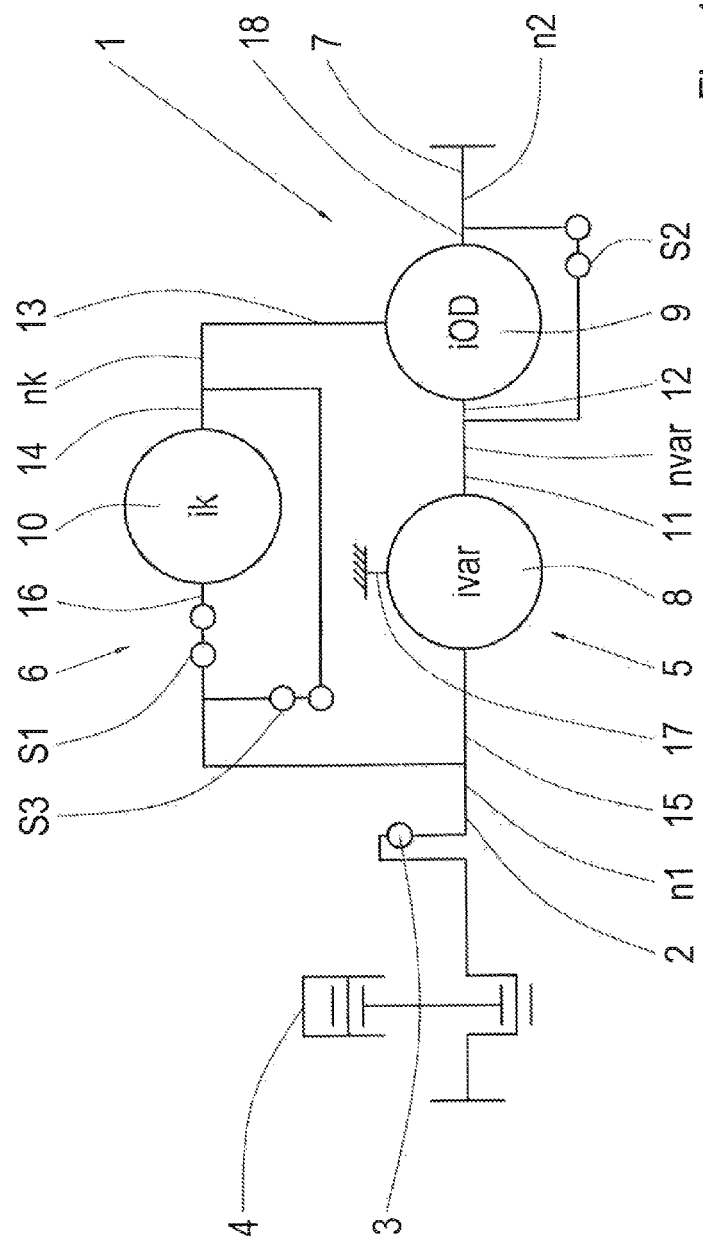
FIG. 1 a transmission diagram of the transmission device in accordance with exemplary aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of an exemplary power-split, continuously variable transmission device 1, which, in the area of the transmission input shaft 2, is in operative connection through a torsional vibration damper 3 with a drive motor 4. In the present case, the drive motor 4 is formed as an internal combustion engine, preferably as a diesel internal combustion engine.

A torque made available by the drive motor 4 and applying in the area of the transmission input shaft 2 can be guided through a first power path 5 and a second power path 6 by the transmission device 1 in the direction of a transmission output shaft 7, whereas, in the first power path 5, a variator 8 is provided for varying the transmission ratio ivar of the first power path 5 and, in the second power path 6, mechanical transmission ratio components 10 for presenting a constant transmission ratio ik are provided. With the variator 8, the overall transmission ratio of the transmission device 1 can be changed in a continuously variable manner to the desired extent. The portions of the torque applying on the side of the transmission input in the area of the transmission input shaft 2 guided through the two power paths 5 and 6 are summed in the area of a planetary transmission 9 and guided in the direction of the transmission output shaft 7.

In the transmission device 1 in the present case, three transmission ratio ranges V1 to V3 for forward travel and one transmission ratio range R for reverse travel are presented, whereas the summing planetary transmission 9, the at least one additional planetary gear set 10 and the variator 8 thereof are in operative connection with each other in the area of the shafts 11, 12, 13 and 14, and, for the presentation of the three transmission ratio ranges V1 to V3 for forward travel and of one transmission ratio range R for reverse travel, can be coupled with each other in the area of the additional shafts 15, 16, 11 and 18 by the shift elements S1 to S3. A transmission ratio of the transmission device 1 is continuously variable within the transmission ratio ranges V1 through V3 and R by the variator 8.

The variator 8 is formed as a mechanical friction wheel variator with at least three shafts 11, 15 and 17. In order to be able to design the transmission device 1 that is favorable for installation space at least in a radial direction, in the manner described in more detail below, the summing planetary transmission 9, the at least one additional planetary gear set 10 and the variator 8, and thus the transmission input shaft 2 and the transmission output shaft 7, are arranged in a manner coaxial to each other.

The transmission device 1 constitutes a power-split multi-range transmission in an input-coupled assembly, with which, with a suitable selection of a constant transmission ratio ik and a circulation transmission ratio i2var between the transmission output shaft 7 and the first power path 5, through the corresponding adjustment of the transmission ratio in the area of the variator 8 into the first transmission ratio range VI for forward travel or into the transmission ratio range R for reverse travel, as the case may be, a stationary output can be presented with a simultaneously rotating drive, whereas this operating state of the transmission device 1 is also designated as a geared neutral operating state, at which a rotational speed n1 of the transmission input shaft 2 is greater than zero and a rotational speed n2 of the transmission output shaft 7 is equal to zero.

From the geared neutral operating state of the transmission device 1, through adjusting the transmission ratio ivar of the variator 8 both in the forward direction and in the reverse direction, the vehicle can be started up from the vehicle standstill. Advantageously, this may be carried out without an additional start-up element, by which the transmission device 1 can be designed in a manner that is favorable for weight, costs and installation space.

Figure 2:
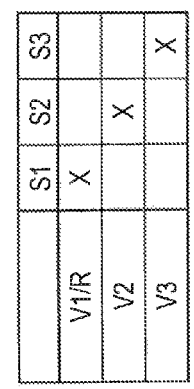
FIG. 2 a shifting diagram of the exemplary transmission device in accordance with FIG. 1.

FIG. 2 shows a tabular shifting diagram of the transmission device 1. From the shifting diagram, it may be seen that, for the presentation of the first transmission ratio range V1 for forward travel or the transmission ratio range R for reverse travel, the shift element S1 is to be closed, while the other two shift elements S2 and S3 are present in an open operating state. If there is a corresponding requirement to present the second transmission ratio range V2 for forward travel, with a currently engaged first transmission ratio range V1 for forward travel or an engaged transmission ratio range R for reverse travel, the first shift element S1 is opened, and the second shift element S2 is closed, while the third shift element S3 is left in an open operating state. If, starting from the second transmission ratio range V2 for forward travel, the third transmission ratio range V3 for forward travel in the transmission device 1 is engaged, for this purpose, the second shift element S2 is opened and the third shift element S3 is closed, while the first shift element S1 is left in an open operating state.

With an engaged second transmission ratio range V2 for forward travel, the entire torque introduced by the transmission input shaft 2 into the transmission device 1 is guided by the variator 8 in the direction of the transmission output shaft 7, by which the second transmission ratio range V2 presents a so-called "direct driving range," the spread of which corresponds to the spread of the variator 8.

In order to be able to design the shift elements S1 to S3 as shift elements with low drag torque, such as positive-locking shift elements, the assemblies arranged in the first power path are adjusted to the constant transmission ratio ik of the second power path 6 provided for the change of areas, and thus the change can be carried out, at least approximately synchronously, to the extent desired for this, between the transmission ratio ranges V1 to V3.

In order to be able to present the geared neutral operating state of the transmission device 1, with the design of the transmission device 1, the circulation transmission ratio i2var is to be determined according to the following formulaic relationship (I):

$$i2\mathrm{var} = (n2 - nk)/(n\mathrm{var} - nk) \quad (I)$$

Thereby, the variable nk corresponds to the rotational speed of the shaft 14 of the additional planetary gear set 10, while the variable nvar designates the rotational speed of the shaft 11 of the variator 8 or the shaft 12 of the planetary transmission 9, as the case may be.

Taking into account the formulaic relationship (I) in conjunction with the transmission ratios ivar and ik, the reciprocal overall transmission ratio 1/ig of the transmission device 1 can be determined with general validity in accordance with the following formulaic relationship (II):

$$1/ig = (i2\mathrm{var} \times (ik - i\mathrm{var}) + i\mathrm{var})/(i\mathrm{var} \times ik) \quad (II)$$

In order to be able to present the stationary output desired in the geared neutral operating state, with a simultaneously rotating drive of the transmission device 1, the transmission ratio ig of the transmission device 1 is to be adjusted to infinite. It follows from this that the relationship between the circulation transmission ratio i2var and the variable transmission ratio ivar, multiplied by the difference between the variable transmission ratio ivar and the constant transmission ratio ik, as indicated in the following formulaic relationship (III), must be equal to 1 as follows:

$$(i2\mathrm{var}/i\mathrm{var}) \times (i\mathrm{var} - ik) = 1 \quad (III)$$

It is often the case that summing transmissions, such as the summing planetary transmission 9 of the transmission device 1, are characterized by their stationary transmission ratio iOD. If, instead of the circulating transmission ratio i2var, the stationary transmission ratio iOD is used, six conditions (independent of each other) arise for achieving a stationary output, with a simultaneously rotating drive, which are applicable to the respective connection variant of the shafts 9, 12 and 18 of the summing planetary transmission 9. The conversion between the circulation transmission ratio i2var and the stationary transmission ratio iOD is carried out by the so-called "Willis equation."

If the summing planetary transmission 9 is designed as a three-shaft planetary gear set with a ring gear, a carrier and a sun gear, with a design of the shaft 12 as a sun, the shaft 13 as a carrier and the shaft 18 as a ring gear, the formulaic relationship (III) is as follows:

$$(i\mathrm{var}/ik) \times (1 - iOD) = 1 \quad (IV)$$

If, in contrast to this, the shaft 18 is designed as a sun, the shaft 12 is designed as a carrier and the shaft 13 is designed as a ring gear, the formulaic relationship (III) is as follows:

$$(ik \times (iOD - 1))/(iOD \times i\mathrm{var}) = 1 \quad (V)$$

Alternatively, the option exists of designing the shaft 13 as a sun, the shaft 12 as a carrier and the shaft 18 as a ring gear, whereas the formulaic relationship (III) then arises as follows:

$$(ik/i\mathrm{var}) \times (1 - iOD) = 1 \quad (VI)$$

With one arrangement of the transmission device 1, with which the shaft 13 is designed as a sun gear, the shaft 18 is designed as a carrier and the shaft 12 is designed as a ring gear, the formulaic relationship (III) is equal to the following:

$$(iOD \times ik)/i\mathrm{var} = 1 \quad (VII)$$

In contrast to this, with one design of the shaft 18 as a sun, the shaft 13 as a carrier and the shaft 12 as a ring gear, the formulaic relationship (III) is as follows:

$$((iOD - 1) \times i\mathrm{var})/(ik \times iOD) = 1 \quad (VIII)$$

With one connection variant of shafts of the summing planetary transmission 9, with which the shaft 12 is designed as a sun gear, the shaft 18 is designed as a carrier and the shaft 13 is designed as a ring gear, the sixth condition is equal to the following:

$$(iOD \times i\mathrm{var})/ik = 1 \quad (IX)$$

Figure 3:
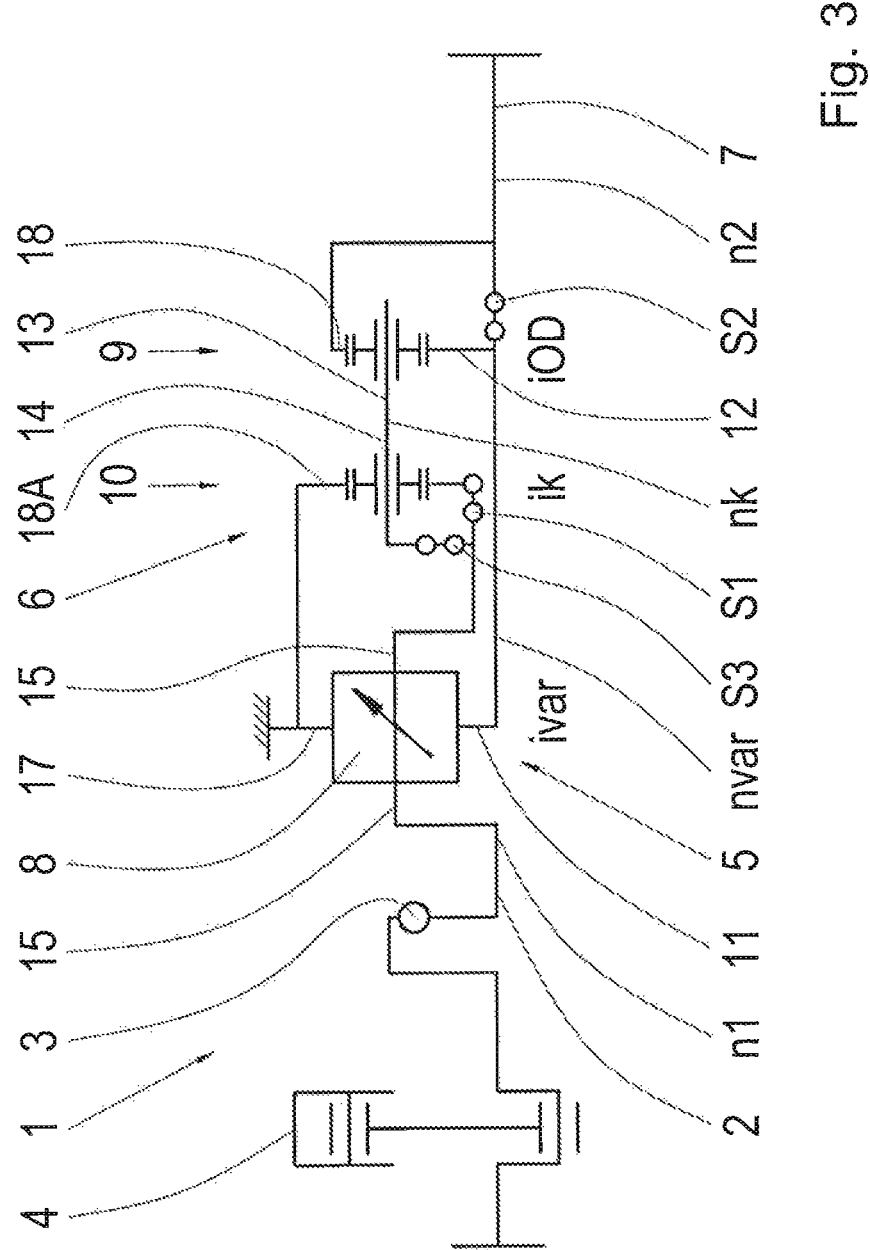
FIG. 3 a gear diagram of a first preferred embodiment of the continuously variable, power-split transmission device in accordance with exemplary aspects of the invention.

FIG. 3 shows a gear diagram of a first exemplary embodiment of the transmission device 1, with which the planetary gear set 10 of the second power path 6, in the area of the shaft 16 designed as a sun gear, can be coupled with the shaft 15 of the variator 8 by the first shift element S1, while the shaft 15 of the variator 8 can be brought into operative connection with the shaft 14, designed as a carrier, of the planetary gear set 10 by the third shift element S3. In the present case, as with the shaft 17 of the variator 8, a shaft 18A of the planetary gear set 10 designed as a ring gear is fixed in a torque-proof manner on the housing side.

In addition, the planetary gear set 10, in the area of its carrier 14, is in operative connection in a torque-proof manner with the shaft 13 of the summing planetary transmission 9 that is also designed as a carrier. By the second shift element S2, the shaft 12 designed as a sun gear and the shaft 18 designed as a ring gear of the summing planetary transmission 9 are connectable to each other in a torque-proof manner, whereas, in the closed operating state of the second shift element S2, the shaft 11 of the variator 8 is directly connected to the transmission output shaft 7.

In contrast to the design of the exemplary transmission device 1 in accordance with FIG. 3, FIG. 4 through FIG. 6 show additional exemplary arrangements of the transmission device 1, which in each case are formed with an additional planetary gear set 19, through which the transmission ratio ivar of the first power path 5 can be adjusted to the desired extent, depending on the particular application. Thereby, with the exemplary design of the transmission device 1 in accordance with FIG. 4 and FIG. 5, the planetary gear set 19 is downstream to the variator 8 in the power flow, while, with the transmission device 1 in accordance with FIG. 6, the additional planetary gear set 19 is upstream to the variator 8 in the power flow.

Figure 6:
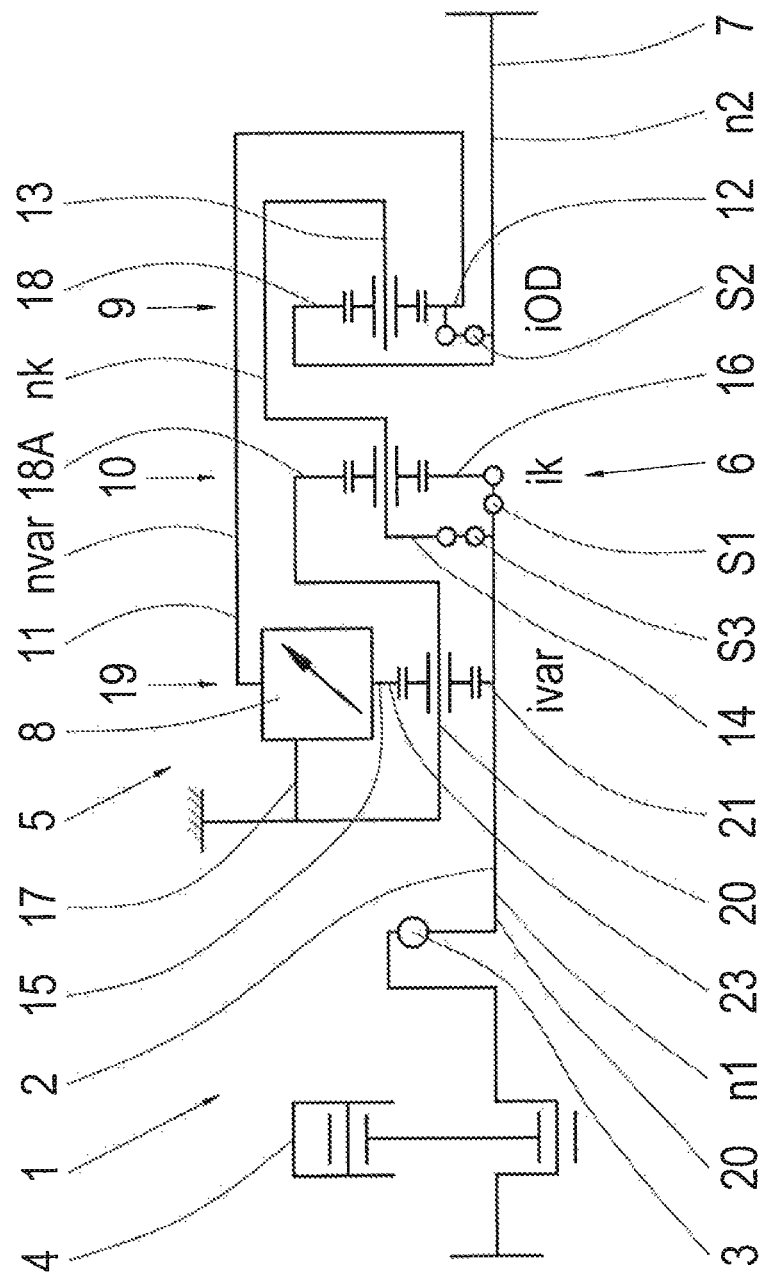
FIG. 6 a view corresponding to FIG. 3 of a fourth preferred embodiment of the continuously variable, power-split transmission device in accordance with exemplary aspects of the invention.

This means that, with the exemplary transmission device 1 in accordance with FIG. 6, the shaft 15 of the variator 8 is in operative connection with the transmission input shaft 2 by the additional planetary gear set 19. The additional planetary gear set 19 is connected in a torque-proof manner to the transmission input shaft 2 in the area of its shaft 21, and is attached to the shaft 15 of the variator 8 in the area of its shaft 23. With the exemplary transmission device 1 in accordance with FIG. 6, through the upstream connection of the additional planetary gear set 19, the additional planetary gear set 19 and the variator 8 are interlaced with each other, which is possible because of the planetary design of the variator 8.

Figure 4:
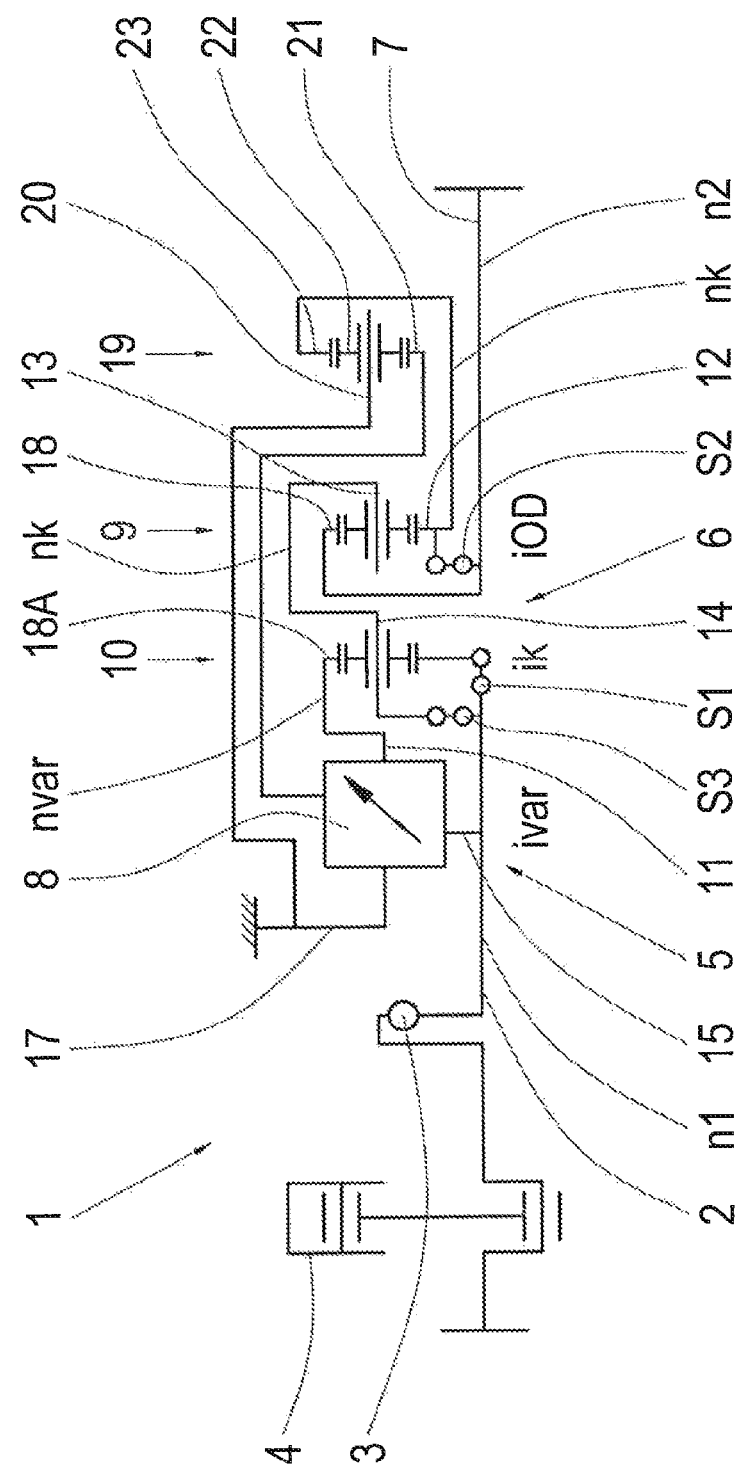
FIG. 4 a view corresponding to FIG. 3 of a second preferred embodiment of the continuously variable, power-split transmission device in accordance with exemplary aspects of the invention.

With the design of the exemplary transmission device 1 in accordance with FIG. 4, a shaft 20 formed as a carrier of the additional planetary gear set 19 is fixed on the housing side, and is thus coupled with the shaft 17 of the variator 8. A shaft 21 designed as a sun gear of the additional planetary gear set 19 is connected in a torque-proof manner to the shaft 11 of the variator 8, by which the torque applying at the shaft 11 is introduced through the shaft 21 into the additional planetary gear set 19 and is further led through planetary gears 22 to a third shaft 23 of the additional planetary gear set 19, which in the present case is designed as a ring gear. In the present case, the third shaft 23 of the additional planetary gear set 19 is connected in a torque-proof manner to the sun gear 12 of the summing planetary transmission 9, by which the part of the torque in the summing planetary transmission 9 guided through the first power path 5 is introduced, in the described extent, through the additional planetary gear set 19 starting from the variator 8.

Figure 5:
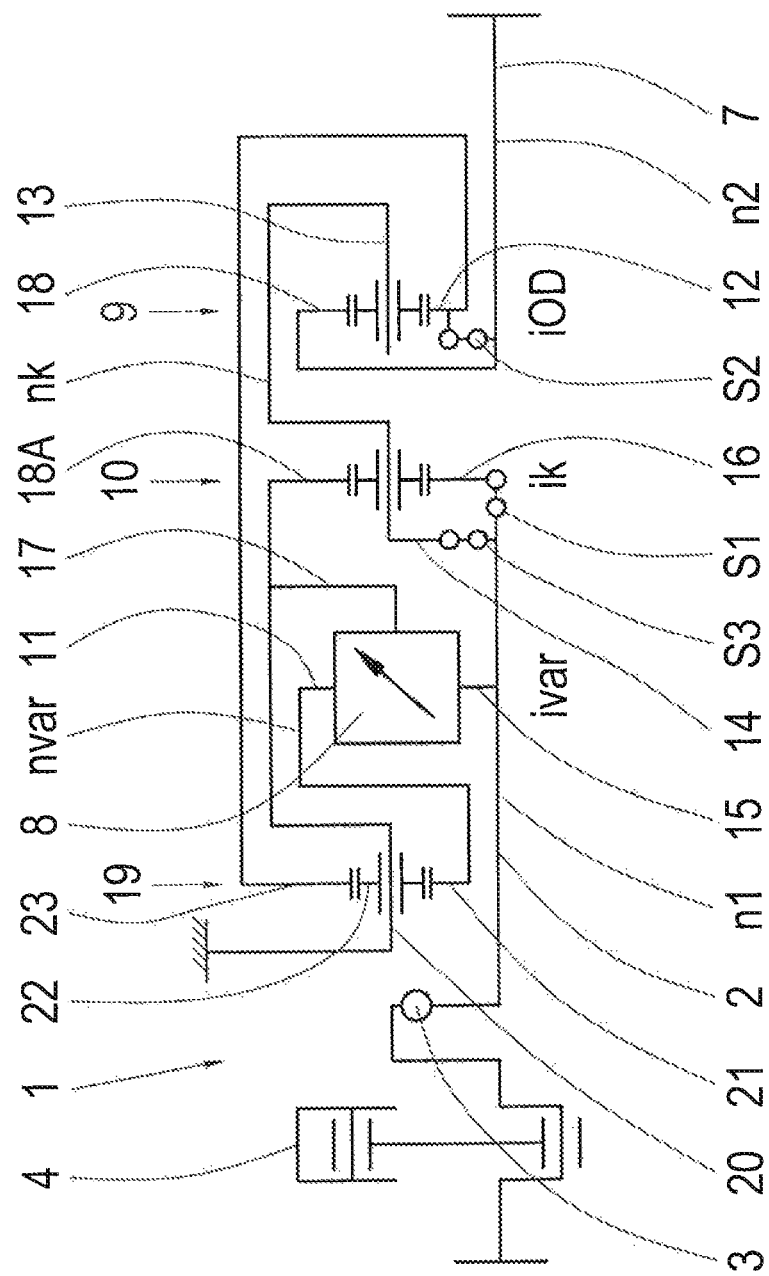
FIG. 5 a view corresponding to FIG. 3 of a third preferred embodiment of the continuously variable, power-split transmission device in accordance with exemplary aspects of the invention.

In the exemplary transmission device 1 in accordance with FIG. 5, in contrast to the exemplary transmission device 1 in accordance with FIG. 4, the additional planetary gear set 19 is arranged not on the side of the transmission output, but on the side of the transmission input; however, it is arranged in the first power path 5 of the transmission device to the same extent as in the exemplary transmission device 1 in accordance with FIG. 4, between the variator 8 and the summing planetary transmission 9.

With the design of the exemplary transmission device 1 in accordance with FIG. 4 through FIG. 6, the variable transmission ratio ivar is composed of the transmission ratio adjusted in the area of the variator 8 and the transmission ratio of the additional planetary gear set 19, by which the spread of the variator 8 is adjustable with little effort for the particular application by the transmission ratio of the planetary gear set 10.

Figure 7:
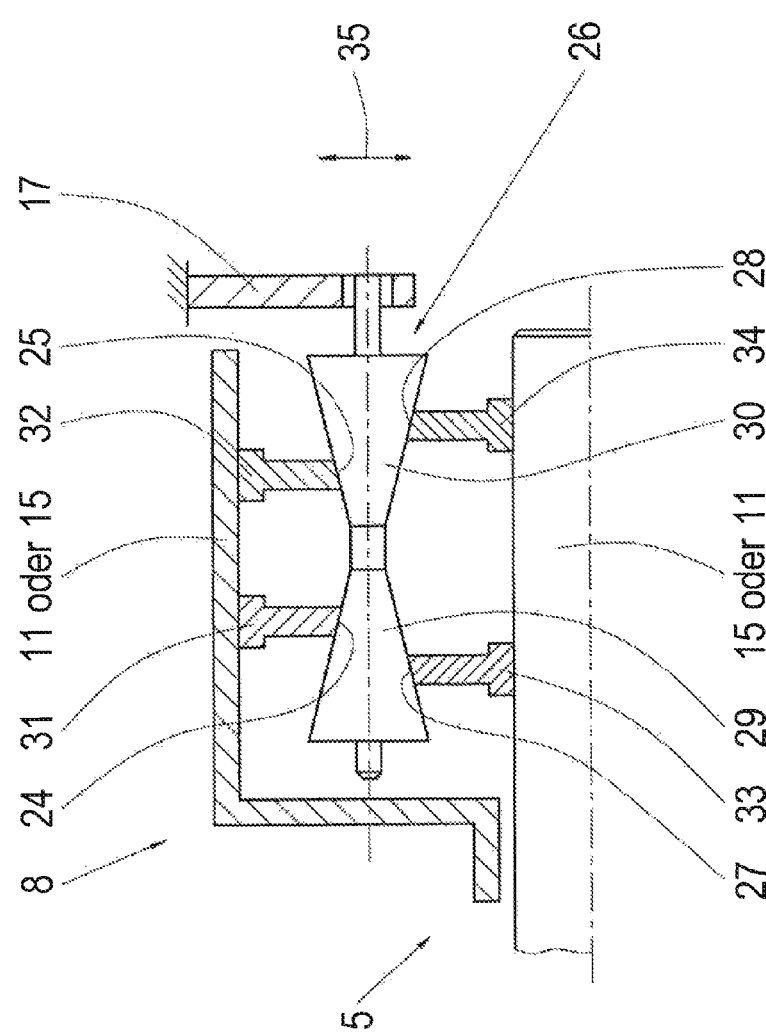
FIG. 7 a schematic detailed view of a first preferred embodiment of a variator of the exemplary transmission device in accordance with FIG. 1.
Figure 8:
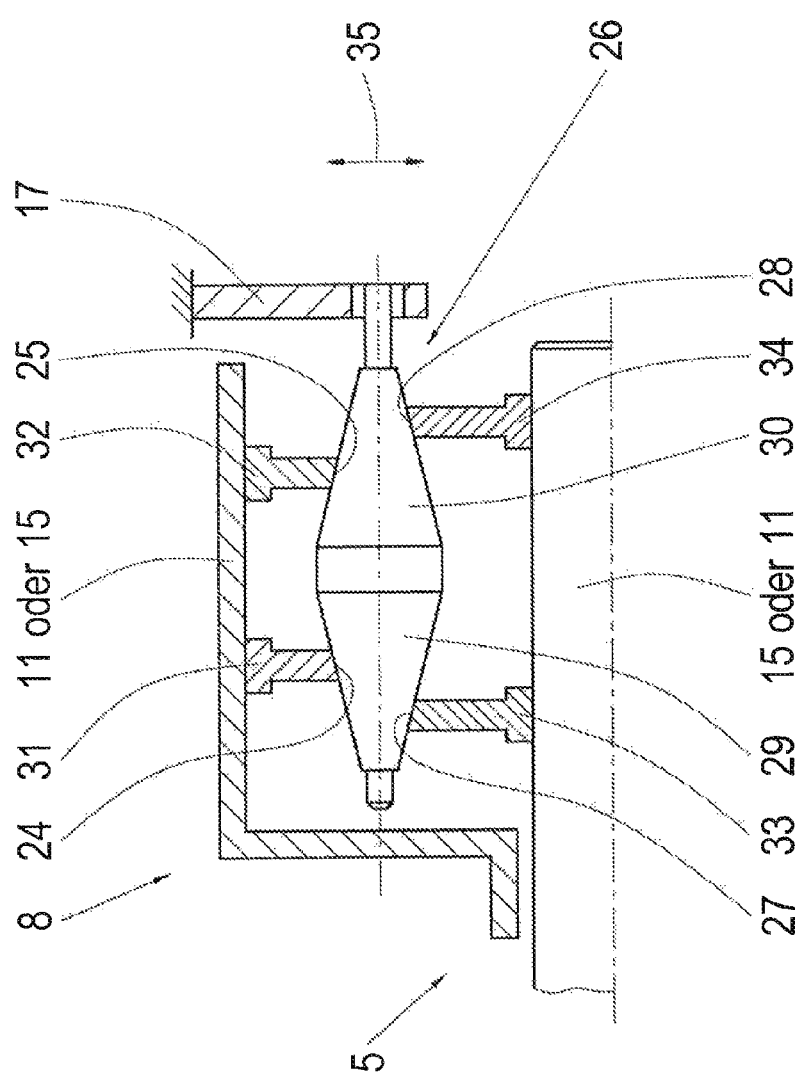
FIG. 8 a view corresponding to FIG. 7 of a second preferred embodiment of the variator of the exemplary transmission device in accordance with FIG. 1.

FIG. 7 and FIG. 8 show two different exemplary embodiments of the variator 8 in a schematic detailed view, whereas, in both embodiments of a planetary gear set, the variator 8 is accordingly designed with a ring gear featuring friction surfaces 24, 25, which in the present case corresponds to the shaft 11 or 15 of the variator 8, several friction wheels 26 formed as planetary gears and a sun gear likewise featuring friction surfaces 27, 28, which in the present case corresponds to the shaft 15 or 11. The friction wheels or planetary gears 26 are designed to be cone-shaped at least in sections, and, with their cone-shaped areas 29 and 30, are in operative connection with the friction surfaces 27 and 28 designed to be cone-shaped of the sun gear 15 or 11 and the friction surfaces 24, 25 of the ring gear 11 or 15.

In the present case, each of the ring gear 11 or 15 and the sun gear 15 or 11 is designed to be split. At the same time, the planetary gears 26 are designed as double truncated cones. A radius of the truncated cone areas 29 and 30 of the planetary gears 26 steadily increases from the areas of the truncated cone areas 29 and 30 turned towards each other in the direction of the areas of the truncated cone areas 29 and 30 turned away from each other. In each case, a first part 31 of the ring gear 11 or 15 and a first part 33 of the sun gear 15 or 11, with their conical friction surfaces 24 and 27, makes contact with the first truncated cone areas 29 of the planetary gears 26, while a second part 32 of the ring gear 11 or 15 and a second part 34 of the sun gear 15 or 11, with their conical friction surfaces 25 and 28, makes contact with the second truncated cone areas 30 of the planetary gears 26.

In order to be able to change the transmission ratio of the variator 8, the parts 31 and 32 of the ring gear 11 or 15 and the parts 33 and 34 of the sun gear 15 or 11 are formed, in the axial extension of the planetary gears 26, in the manner that they are able to be moved to and from each other. The planetary gears 26 are arranged in a manner adjustable in relation to the ring gear 11 or 15 and the sun gear 15 or 11 in the radial directions, marked by the double arrow 35, with respect to the shaft 17 of the variator 8, which in the present case is designed as a planetary carrier, in which the planetary gears 26 are rotatably mounted. This means that the parts 31 and 32 of the ring gear 11 or 15 and the parts 33 and 34 of the sun gear 15 or 11 must only be spread apart for adjusting the transmission ratio of the variator 8, and need not be pulled.

In contrast to this, the radius of the truncated cone areas 29 and 30 of the planetary gears 26 of the variator 8 in accordance with FIG. 8 decreases from the areas of the truncated cone areas 29 and 30 turned towards each other in the direction of the areas of the truncated cone areas 29 and 30 turned away from each other, by which, with the design of the variator 8 in accordance with FIG. 8, a bending torque load of the planetary gears 26 is smaller than with the design of the variator 8 in accordance with FIG. 7.

Modifications and variations can be made to the embodiments illustrated or described herein without departing from the scope and spirit of the invention as set forth in the appended claims.

REFERENCE SIGNS

1 Transmission device
2 Transmission input shaft
3 Torsional vibration damper
4 Drive motor
5 First power path
6 Second power path
7 Transmission output shaft
8 Variator
9 Summing planetary transmission
10 Additional planetary gear set
11 Shaft of the variator 12 Shaft of the summing planetary transmission
13 Shaft of the summing planetary transmission
14 Shaft of the additional planetary gear set
15 Shaft of the variator
16 Shaft of the additional planetary gear set
17 Shaft of the variator
18 Shaft of the summing planetary transmission
18A Shaft of the additional planetary gear set
19 Additional planetary gear set
20 Shaft of the additional planetary gear set
21 Shaft of the additional planetary gear set
22 Planetary gear of the additional planetary transmission
23 Shaft of the additional planetary transmission
24, 25 Friction surface
26 Friction wheel, planetary gear of the variator
27, 28 Friction surface
29, 30 Cone-shaped area of the friction wheel of the variator
31, 32 Part of the ring gear of the variator
33, 34 Part of the sun gear of the variator
n1 Rotational speed of the transmission input shaft
n2 Rotational speed of the transmission output shaft
nk Rotational speed of the second power path
nvar Rotational speed of the first power path
ik Constant transmission ratio of the second power path
ivar Variable transmission ratio of the first power path
iOD Stationary transmission ratio of the summing planetary transmission
S1 to S3 Shift element
V1 to V3 Transmission ratio range for forward travel
R Transmission ratio range for reverse travel

The invention claimed is:

1. A power-split, continuously variable transmission device, comprising:
an input shaft;
an output shaft;
a summing planetary transmission, the summing planetary transmission comprising a sun gear, a carrier and a ring gear;
at least one planetary gear set;
a variator, the variator being a mechanical friction wheel variator having at least three shafts, a friction wheel of the variator being approximately cone-shaped, at least in sections, the at least three shafts of the variator comprising a first shaft, a second shaft and a third shaft;
a first plurality of shafts, the summing planetary transmission, the at least one planetary gear set and the variator in operative connection with one another by the shafts of the first plurality of shafts;
a second plurality of shafts;
a plurality of shift elements, the shafts of the second plurality of shafts couplable with the plurality of shift elements for presentation of at least three transmission ratio ranges; and
an additional planetary gear set allocated to the variator, one shaft of the additional planetary gear set coupled with the third shaft of the variator, at least one additional shaft of the additional planetary gear set coupled with the first shaft of the variator or is connectable with the first shaft of the variator with one of the shift elements of the plurality of shift elements that is in operative connection with the input shaft,
wherein a continuously variable transmission ratio of the at least three transmission ratio ranges is provided by the variator,
wherein the summing planetary transmission, the at least one planetary gear set and the variator are arranged coaxial to one another, and
wherein, in one of the at least three transmission ratio ranges, a total power is guidable between the input shaft and the output shaft by the variator.

2. The power-split, continuously variable transmission of claim 1, wherein the first shaft of the variator is operatively connected to the input shaft, the second shaft of the variator is operatively connected to the output shaft, and the third shaft of the variator is rotationally fixed.

3. The power-split, continuously variable transmission of claim 2, wherein one shaft of the at least one planetary gear set is coupleable with the input shaft with one of the shift elements of the plurality of shift elements.

4. The power-split, continuously variable transmission of claim 2, wherein the first shaft of the variator is in operative connection to the input shaft through the additional planetary gear set.

5. The power-split, continuously variable transmission of claim 2, wherein the first shaft of the variator is connectable by one of the shift elements of the plurality of shift elements to a shaft of the at least one planetary gear set designed as a sun gear, the first shaft of the variator also connectable by an additional shift element of the plurality of shift elements to another shaft of the at least one planetary gear set designed as a carrier.

6. The power-split, continuously variable transmission of claim 2, wherein the second shaft of the variator is coupled to the output shaft with a shaft formed as a sun gear of the summing planetary transmission and with a shaft formed as a ring gear of the summing planetary transmission.

7. The power-split, continuously variable transmission of claim 6, wherein a carrier of the at least one planetary gear set is connected to a shaft of the summing planetary transmission formed as the carrier.

8. The power-split, continuously variable transmission of claim 1, wherein the summing planetary transmission is blocked by one of the plurality of shift elements during presentation of one of the at least three transmission ratio ranges in which an overall power flow between the input shaft and the output shaft is guidable by the variator.

9. The power-split, continuously variable transmission of claim 1, wherein the variator, the summing planetary transmission and the at least one planetary gear set are matched with one another such that a change between the transmission ratio ranges of the at least three transmission ratio ranges is approximately synchronous.

10. The power-split, continuously variable transmission of claim 1, wherein the at least three transmission ratio ranges are presentable with exactly three shift elements of the plurality of shift elements, each shift element of the plurality of shift elements being closed in a respective one of the at least three transmission ratio ranges and the others of the plurality of shift elements being open, each closed shift element opening during a transmission ratio range change.

11. The power-split, continuously variable transmission of claim 1, wherein the variator comprises a ring gear having friction surfaces and a sun gear also having friction surfaces, the friction wheel formed as a planetary gear, the planetary gear formed at least in sections with cone shape areas, the cone-shape areas in frictional-locking operative connection with the friction surfaces of the ring gear and the friction surfaces of the sun gear.

12. The power-split, continuously variable transmission of claim 11, wherein the planetary gear is formed as a double truncated cone, a radius of the double truncated cone of the planetary gear steadily increasing or steadily decreasing from areas of the truncated cone turned towards each other, the ring gear and the sun gear formed to be split, a first part of the ring gear and of the sun gear contacting a first truncated cone area of the planetary gear with conical friction surfaces, a second part of the ring gear and of the sun gear contacting a second truncated cone area of the planetary gear with the conical friction surfaces.

13. The power-split, continuously variable transmission of claim 12, wherein, the first and second parts of the ring gear and the sun gear are movable to and from each other in order to vary the transmission ratio of the variator, the planetary gear radially adjustable relative to the ring gear and the sun gear and relative to a planetary carrier, in which the planetary gear is rotatably mounted.

14. The power-split, continuously variable transmission of claim 1, wherein the ring gear of the summing planetary transmission is in operative connection with the output shaft.

15. A power-split, continuously variable transmission device, comprising:
an input shaft;
an output shaft;
a summing planetary transmission, the summing planetary transmission comprising a sun gear, a carrier and a ring gear;
at least one planetary gear set;
a variator, the variator being a mechanical friction wheel variator having at least three shafts, a friction wheel of the variator being approximately cone-shaped, at least in sections;
a first plurality of shafts, the summing planetary transmission, the at least one planetary gear set and the variator in operative connection with one another by the shafts of the first plurality of shafts;
a second plurality of shafts; and
a first plurality of shift elements, the shafts of the second plurality of shafts couplable with the plurality of shift elements for presentation of at least three transmission ratio ranges,
wherein a continuously variable transmission ratio of the at least three transmission ratio ranges is provided by the variator,
wherein the summing planetary transmission, the at least one planetary gear set and the variator are arranged coaxial to one another,
wherein, in one of the at least three transmission ratio ranges, a total power is guidable between the input shaft and the output shaft by the variator, and
wherein the summing planetary transmission is blocked by one of the plurality of shift elements during presentation of one of the at least three transmission ratio ranges in which an overall power flow between the input shaft and the output shaft is guidable by the variator.

16. A power-split, continuously variable transmission device, comprising:
an input shaft;
an output shaft;
a summing planetary transmission, the summing planetary transmission comprising a sun gear, a carrier and a ring gear;
at least one planetary gear set;
a variator, the variator being a mechanical friction wheel variator having at least three shafts, a friction wheel of the variator being approximately cone-shaped, at least in sections;
a first plurality of shafts, the summing planetary transmission, the at least one planetary gear set and the variator in operative connection with one another by the shafts of the first plurality of shafts;
a second plurality of shafts; and
a plurality of shift elements, the shafts of the second plurality of shafts couplable with the plurality of shift elements for presentation of at least three transmission ratio ranges,
wherein a continuously variable transmission ratio of the at least three transmission ratio ranges is provided by the variator,
wherein the summing planetary transmission, the at least one planetary gear set and the variator are arranged coaxial to one another,
wherein, in one of the at least three transmission ratio ranges, a total power is guidable between the input shaft and the output shaft by the variator, and
wherein the at least three transmission ratio ranges are presentable with exactly three shift elements of the plurality of shift elements, each shift element of the plurality of shift elements being closed in a respective one of the at least three transmission ratio ranges and the others of the plurality of shift elements being open, each closed shift element opening during a transmission ratio range change.

17. A power-split, continuously variable transmission device, comprising:
an input shaft;
an output shaft;
a summing planetary transmission, the summing planetary transmission comprising a sun gear, a carrier and a ring gear;
at least one planetary gear set;
a variator, the variator being a mechanical friction wheel variator having at least three shafts, a friction wheel of the variator being approximately cone-shaped, at least in sections;
a first plurality of shafts, the summing planetary transmission, the at least one planetary gear set and the variator in operative connection with one another by the shafts of the first plurality of shafts;
a second plurality of shafts; and
a plurality of shift elements, the shafts of the second plurality of shafts couplable with the plurality of shift elements for presentation of at least three transmission ratio ranges,
wherein a continuously variable transmission ratio of the at least three transmission ratio ranges is provided by the variator,
wherein the summing planetary transmission, the at least one planetary gear set and the variator are arranged coaxial to one another,
wherein, in one of the at least three transmission ratio ranges, a total power is guidable between the input shaft and the output shaft by the variator, and
wherein the variator comprises a ring gear having friction surfaces and a sun gear also having friction surfaces, the friction wheel formed as a planetary gear, the planetary gear formed at least in sections with cone shape areas, the cone-shape areas in frictional-locking operative connection with the friction surfaces of the ring gear and the friction surfaces of the sun gear.

* * * * *